United States Patent
Eshghi et al.

(10) Patent No.: US 8,208,726 B2
(45) Date of Patent: Jun. 26, 2012

(54) METHOD AND SYSTEM FOR OPTICAL CHARACTER RECOGNITION USING IMAGE CLUSTERING

(75) Inventors: Kave Eshghi, Los Altos, CA (US); George Forman, Port Orchard, WA (US); Prakash Reddy, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 12/841,839

(22) Filed: Jul. 22, 2010

(65) Prior Publication Data

US 2012/0020561 A1 Jan. 26, 2012

(51) Int. Cl.
*G06K 9/34* (2006.01)
(52) U.S. Cl. .................................. 382/177; 382/309
(58) Field of Classification Search ............... 382/177, 382/224–225, 229, 232, 235, 309, 310
See application file for complete search history.

(56) References Cited

U.S. PATENT DOCUMENTS

| | | | |
|---|---|---|---|
| 5,307,422 A | 4/1994 | Wang | |
| 5,410,611 A | 4/1995 | Huttenlocher et al. | |
| 5,539,841 A | 7/1996 | Huttenlocher et al. | |
| 5,687,253 A | 11/1997 | Huttenlocher et al. | |
| 5,825,919 A | 10/1998 | Bloomberg et al. | |
| 7,761,466 B1 | 7/2010 | Eshghi | |
| 2006/0171588 A1 | 8/2006 | Chellapilla et al. | |
| 2009/0263019 A1 | 10/2009 | Tzadok et al. | |

OTHER PUBLICATIONS

Eshghi, Kave, et al., "Locality Sensitive Hash Functions Based on Concomitant Rank Order Statistics," Proceedings of the 14th ACM SIGKDD International Conference on Knowledge Discovery and Data Mining, Aug. 2008, Las Vegas, Nevada, available at http://www.hpl.hp.com/techreports/2007/HPL-2007-192R1.pdf (last accessed on Jul. 22, 2010).

*Primary Examiner* — Duy M Dang

(57) ABSTRACT

The present disclosure provides a computer-implemented method of translating an image-based electronic document into a text-based electronic document. The method includes electronically scanning an image-based document to determine positions of word images in the image-based document. The method also includes extracting the word images from the image-based document and storing the word images to an electronic storage device. The method also includes grouping a subset of the word images into a word cluster based on a similarity of the word images, wherein the word images in the word cluster correspond to a same actual word. The method also includes generating a character-encoded transcription for the word cluster based on the word images in the word cluster. The method also includes adding the character-encoded transcription to a text-based electronic document at locations corresponding to the positions of the word images in the image-based document.

20 Claims, 6 Drawing Sheets

400

METHOD AND SYSTEM FOR OPTICAL CHARACTER RECOGNITION USING IMAGE CLUSTERING

BACKGROUND

Optical character recognition (OCR) is a widely used tool for converting printed documents into an electronic format, wherein images of text are transcribed into character-encoded text. Converting text images into character-encoded text provides an electronic document that can be searched, edited, reformatted, and more compactly stored. However, OCR often results in errors due to noise in the text images.

BRIEF DESCRIPTION OF THE DRAWINGS

Certain embodiments are described in the following detailed description and in reference to the drawings, in which.

DETAILED DESCRIPTION OF SPECIFIC EMBODIMENTS

In an embodiment of the present invention, a method is provided for translating an image-based document into a character-encoded text document using Optical Character Recognition (OCR) of text images. In traditional OCR techniques, the accuracy of the OCR process may be improved by improving the transcription accuracy of individual letters or by considering the context of individual letters within whole words. For example, a dictionary may be used to determine which OCR transcription of a word image, among two or more possible OCR transcriptions, is more likely to be the accurate transcription. In embodiments, the accuracy of the OCR process may be improved by identifying the images of words or glyphs that are repeated, and then using all the images of a repeated word to improve the accuracy of the optical character recognition performed on that word. Multiple instances of a word in the scanned document may be detected using a clustering technique that groups images according to image similarity. The multiple instances of the same word may be used to eliminate noise in the image input to provide a more accurate transcription of the characters in that word.

Figure 1:
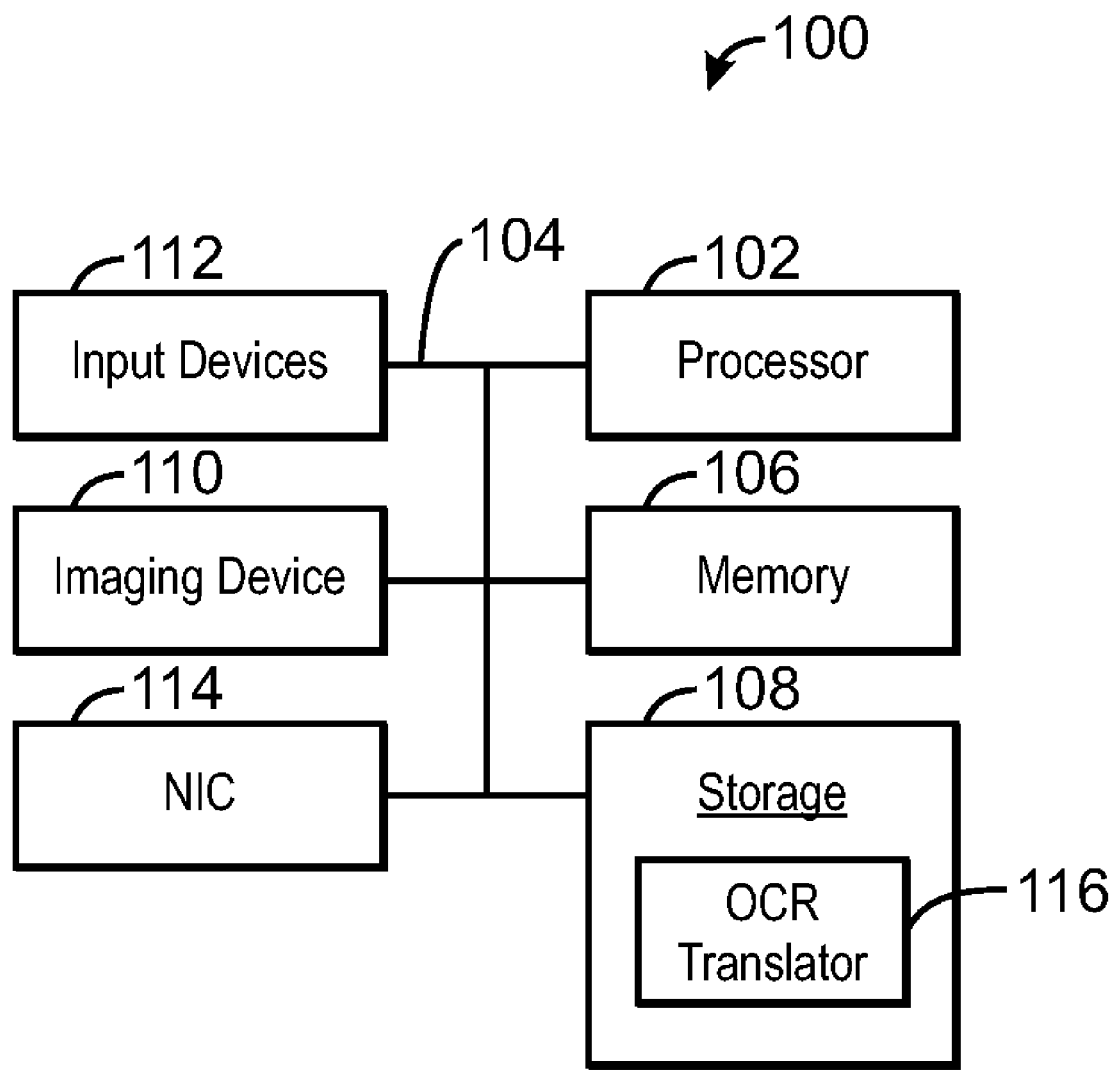
FIG. 1 is a block diagram of a computing device that may be used to translate an image-based document into character-encoded document, in accordance with embodiments of the present invention.

FIG. 1 is a block diagram of a computing device that may be used to translate an image-based document into character-encoded document, in accordance with embodiments of the present invention. The system is generally referred to by the reference number 100. Those of ordinary skill in the art will appreciate that the functional blocks and devices shown in FIG. 1 may comprise hardware elements including circuitry, software elements including computer code stored on a non-transitory, machine-readable medium, or a combination of both hardware and software elements. Further, the configuration is not limited to that shown in FIG. 1, as any number of functional blocks and devices may be used in embodiments of the present invention. Those of ordinary skill in the art would readily be able to define specific functional blocks based on design considerations for a particular electronic device.

As illustrated in FIG. 1, the computing device 100 may include a processor 102 connected through a bus 104 to one or more types of non-transitory, computer readable media, such as a memory 106 that may be used during the execution of various operating programs, including operating programs used in embodiments of the present invention. The memory 106 may include read-only memory (ROM), random access memory (RAM), and the like. The computing device 100 can also include other non-transitory, computer readable media, such as a storage system 108 for the long-term storage of operating programs and data, including the operating programs and data used in embodiments of the present invention. The storage system 108 may include, for example, hard disks, CDs, DVDs, flash memory, and the like. The computing device 100 can include, or can be operatively coupled to, an imaging device 110, such as an optical scanner, digital camera, and the like. The imaging device 110 may be used to capture images of a document, which may be processed according to the techniques described herein. Captured images may be stored to the memory 106 or the storage system 108 for processing.

The computing device 100 can also include one or more input devices 112, such as a mouse, touch screen, and keyboard, among others. In an embodiment, the device 100 includes a network interface controller (NIC) 114, for connecting the device 100 to a network through a local area network (LAN), a wide-area network (WAN), or another network configuration. In an embodiment, the computing device 100 is a general-purpose computing device, for example, a desktop computer, laptop computer, smart phone, business server, and the like. The computing device 100 may also be a peripheral computing device such as a scanner.

The computing device 100 also includes an OCR translator 116 that can translate image-based documents into text-based documents according to the techniques disclosed herein. As used herein, an image-based document refers to an electronic document encoded as an image such as a bitmap. For example, an image-based document may be encoded using any type of image file format, for example, Joint Photographic Experts Group (JPEG), Tagged Image File Format (TIFF), Windows bitmap (BMP), among others. As used herein, a text-based document refers to an electronic text document, wherein words, letters, punctuation, and other characters, are represented by character codes. For example, a text-based document may be encoded using American Standard Code for Information Interchange (ASCII), Unicode, Universal Character Set (UCS), among others.

Figure 2:
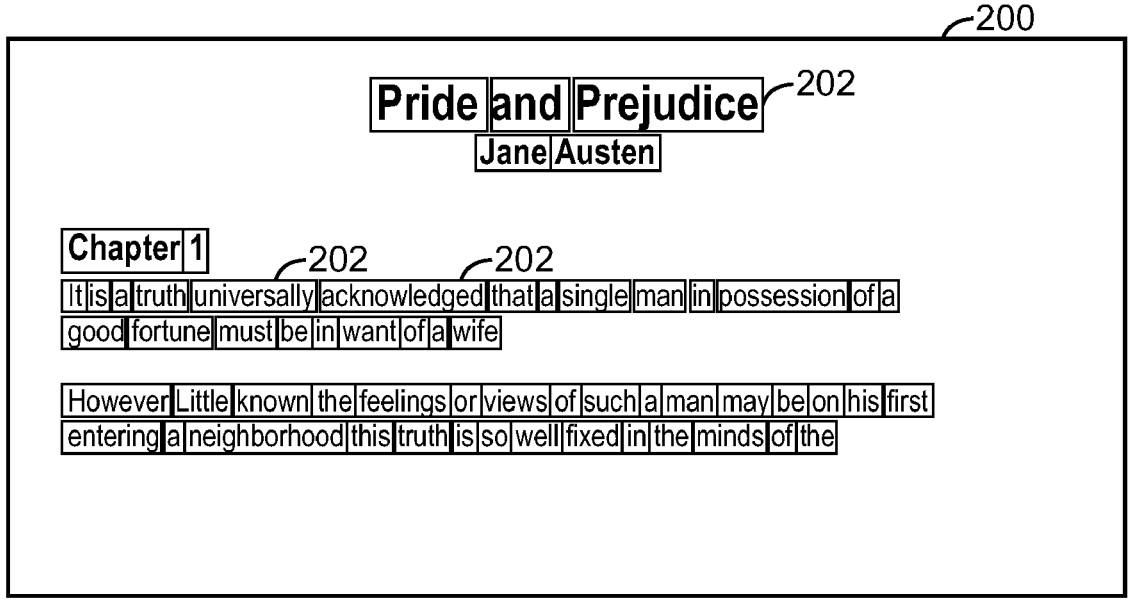
FIG. 2 is an image-based document that may be converted into a text-based document, in accordance with embodiments of the present invention.

FIG. 2 is an image-based document that may be converted into a text-based document, in accordance with embodiments of the present invention. The document 200 may be any electronic document containing images of text, such as a document generated by optically scanning a physical page of text, for example, from a document, a book, a magazine, and the like. In an embodiment, the document 200 may be obtained from a server over a network connection.

The document 200 may be processed by the OCR translator 116 (FIG. 1) to identify individual images 202 of words (hereinafter referred to as word images) contained in the document. Each word image 202 includes the image shown within each corresponding box, as shown in FIG. 2. The OCR translator 116 translates each word image 202 into character-encoded text, using the techniques described below. The character-encoded transcriptions may be used to generate the text-based document.

Figure 3:
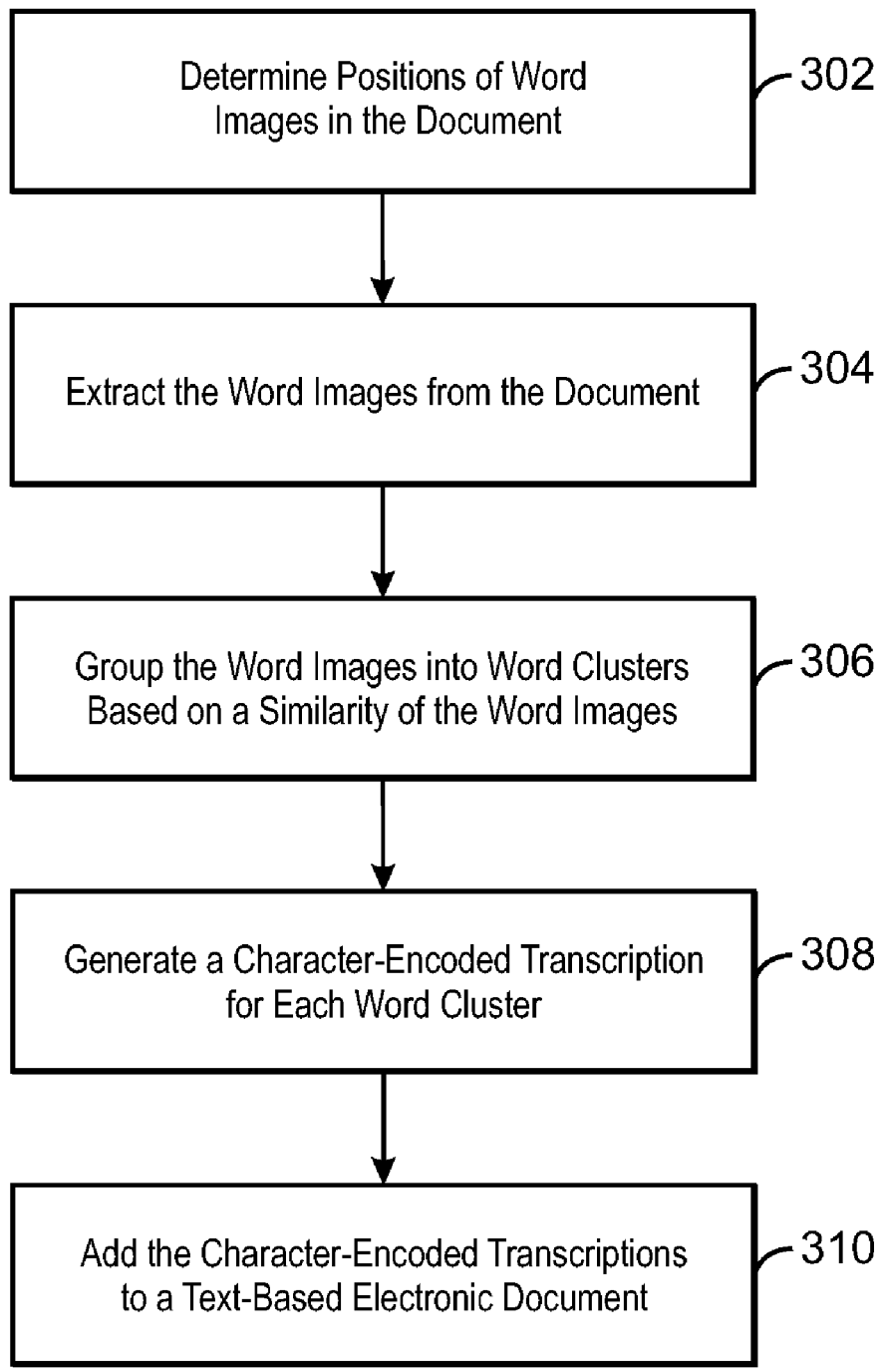
FIG. 3 is a process flow diagram of a method of translating an image-based document into a text-based document, in accordance with embodiments of the present invention.

FIG. 3 is a process flow diagram of a method of translating an image-based document into a text-based document, in accordance with embodiments of the present invention. The method may be referred to by the reference number 300 and may be executed by the OCR translator 116 discussed with respect to FIG. 1.

The method 300 may begin at block 302, wherein an image-based electronic document is electronically processed to determine the positions of individual images of words in the document, as described in relation to FIG. 2. Other information regarding each word image of the document may also be determined, such as font style, font size, line spacing, and the like. Additionally, the relative positions of each word image may be recorded to enable the character-encoded transcription for each word image to be added to the text-based document at the proper location.

At block 304, each of the word images may be extracted from the document. The word images may be encoded using any type of image file format, for example, Joint Photographic Experts Group (JPEG), Tagged Image File Format (TIFF), Windows bitmap (BMP), among others. The word images may be processed to eliminate whitespace and background noise in the image, such as errant marks, slight color variations, and the like. The word images may be stored to a non-transitory, computer readable media, such as the memory 106, or the storage device 108. In embodiments, various derivative feature values, such as the feature vectors and hash values described below in reference to block 306, are extracted and stored as each word image is identified, and the word images themselves are not stored separately.

At block 306, the word images are grouped into clusters based on the similarity of the images. Word images that are visually similar may be grouped into the same cluster, and word images that are visually dissimilar may be grouped into different clusters. Each resulting word cluster can include multiple instances of the same word with the same font-style and size. For example, each instance of the word "universally" in the image-based document with the same font-style and size may be grouped into the same cluster. Upper case and lower case versions of the same word, being visually distinct, may be grouped into different clusters.

Any suitable image clustering technique may be used to generate the image clusters. In embodiments, a dimension reduction algorithm, such as Principle Components Analysis (PCA) may be used to generate an n-dimension feature vector for each word image. The feature vectors may be hashed using a Locality Sensitive Hashing (LSH) Function, such as a Concomitant Rank Order Hash Function. The hashing function provides a set of hash values, or hash set, corresponding to the word image. The degree of similarity between word images corresponds to the degree of similarity between the hash sets generated for the word images. In other words, the degree of similarity between two word images may be described as the degree of intersection between the corresponding hash sets. Word images that are visually similar will be likely to correspond with hash sets that share hash values. Whereas, word images that are dissimilar will be likely to have hash sets that are disjoint. Using the hash sets, a sort-based hash-clustering algorithm may be used to generate the image clusters. By clustering the word images as described herein, all of the word images in a single image cluster are likely to represent the same actual word. As used herein, the "actual word" refers to the word that would be perceived by a reader of the image-based document.

At block 308, a character-coded transcription may be generated for each word cluster. Because the word images in each word cluster represent the same actual word, the word clusters can be used to reduce character recognition errors. Thus, a more accurate OCR transcription may be achieved for each word. Techniques for generating the character-encoded transcription for each word cluster are described in relation to FIGS. 4 and 5.

At block 310, a text-based document is generated by adding the character-encoded transcriptions to an electronic file at locations corresponding to the positions of the word images in the image-based document. Each word in the text-based document corresponds to the character-encoded transcription generated for the word's corresponding word image. In embodiments, the text-based document is an electronic file used for displaying text, for example, a portable document file (PDF), a Microsoft® Word file, a plain text file, among others. The recorded positions of the word images may be used to determine the proper location for each of the character-encoded words in the resulting text-based document. The text-based document may be stored to a non-transitory, computer readable media, such as the memory 106, or the storage device 108.

In embodiments, the text-based document is a reverse index that indicates where each word appears in the image-based document. The character-encoded transcription generated for each word image may be added to the reverse index along with a position indicator corresponding to the recorded positions of the word images. The position indicator identifies where each corresponding word appears in the image-based document. The reverse index may be used, for example, to enable a keyword search to be performed for the image-based document.

Figure 4:
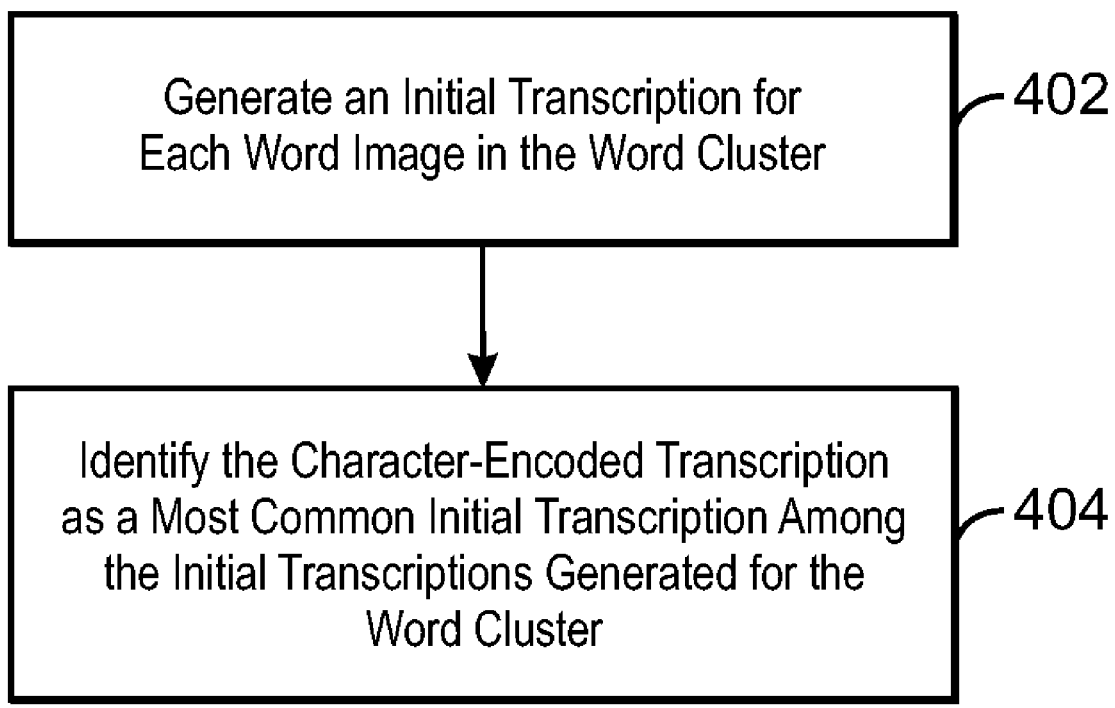
FIG. 4 is a process flow diagram of a method of generating a character-encoded transcription for a word cluster, in accordance with embodiments of the present invention.

FIG. 4 is a process flow diagram of a method of generating a character-encoded transcription for a word cluster, in accordance with embodiments of the present invention. The method may be referred to by the reference number 400 and may be performed at block 308 of FIG. 3. The method may begin at block 402, wherein an initial transcription is generated for each word image in the corresponding word cluster. The initial transcription may be generated by any suitable transcription technique for electronically transcribing an image into character codes. For example, the initial transcription may be generated using any suitable OCR transcription software such as ExperVision, SimpleOCR, and Microsoft Office Document Imaging, among others.

At block 404, the character-encoded transcription for the word image is identified as the most common initial transcription generated for the word cluster. Due to noise affecting the transcription process, the initial transcriptions generated for a single word cluster may not all be identical. The most common initial transcription may be identified by counting the number of occurrences of each unique transcription generated for the word cluster. The unique transcription with the highest count may be identified as the accepted transcription for the word cluster and used for the generation of the character-encoded document, for example, as discussed with respect to block 310 of FIG. 3.

Figure 5:
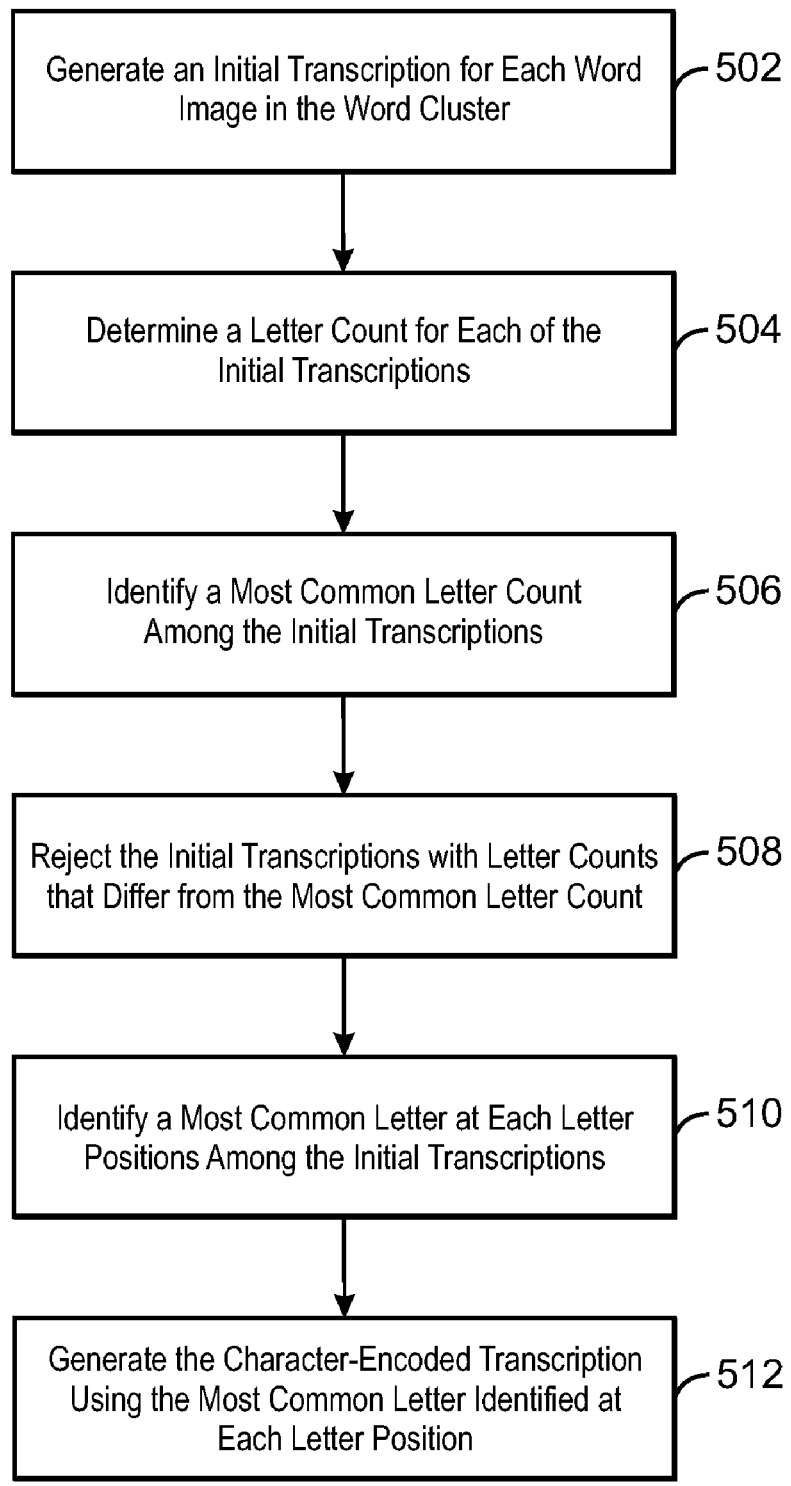
FIG. 5 is a process flow diagram of another method of generating a character-encoded transcription for a word cluster, in accordance with embodiments of the present invention.

FIG. 5 is a process flow diagram of another method of generating a character-encoded transcription for a word cluster, in accordance with embodiments of the present invention. The method may be referred to by the reference number 500 and may be performed at block 308 of FIG. 3. The method may begin at block 502, wherein an initial transcription is generated for each word image in the corresponding word cluster. As noted above, the initial transcription may be generated by any suitable transcription technique for electronically transcribing an image into character codes. For example, given a word cluster that includes six word images corresponding with the actual word "Mary", the corresponding initial transcriptions could be as shown in Table 1 below.

TABLE 1

Example of Initial Transcriptions for a Word Cluster, for which the actual word is "Mary".
Letter Position

| 1 | 2 | 3 | 4 | 5 | 6 | 7 |
|---|---|---|---|---|---|---|
| M | a | r | y |   |   |   |
| N | l | a | r | y |   |   |
| M | a | r | y |   |   |   |
| M | a | n | y |   |   |   |
| V | a | r | y |   |   |   |
| M | a | r | v |   |   |   |

At block 504, the letter count of each of the initial transcriptions may be determined. At block 506, a most common letter count may be identified for the group of initial transcriptions corresponding to the word cluster. At block 508, the initial transcriptions that have a letter count that differs from the most common letter count may be rejected. In the example shown in table 1, the most common letter count is four. Thus, the transcription "Nlary," having five letters, would be rejected. The accepted transcription generated for the word cluster may be based on the remaining words, which now have the same number of letters.

At block 510, a most common letter at each letter position in the group of initial transcriptions may be identified. The most common letter may be identified by counting the number of occurrences of each unique letter at each letter position in the initial transcriptions generated for the word cluster. The unique letter with the highest count may be identified as the accepted letter for the corresponding letter position. For example, continuing with the example provided in Table 1, the most common letter at the first letter position would be determined to be "M", the most common letter at the second letter position would be identified as "a", and so on for the remaining letter positions.

At block 512, the character-encoded transcription for the word cluster may be generated using the most common letter identified at each letter position. For example, following the example provided in Table 1, accepting the most common letter at each letter position yields the accepted transcription "Mary." The accepted transcription may be used for the generation of the text-based document, for example, as discussed with respect to block 310 of FIG. 3.

The methods for generating a character-encoded transcription for each word cluster described in relation to FIGS. 4 and 5 are intended as examples of possible techniques that may be used in accordance with embodiments. Other techniques falling within the scope of the present claims may also occur to those of ordinary skill in the art with the benefit of the present description.

Figure 6:
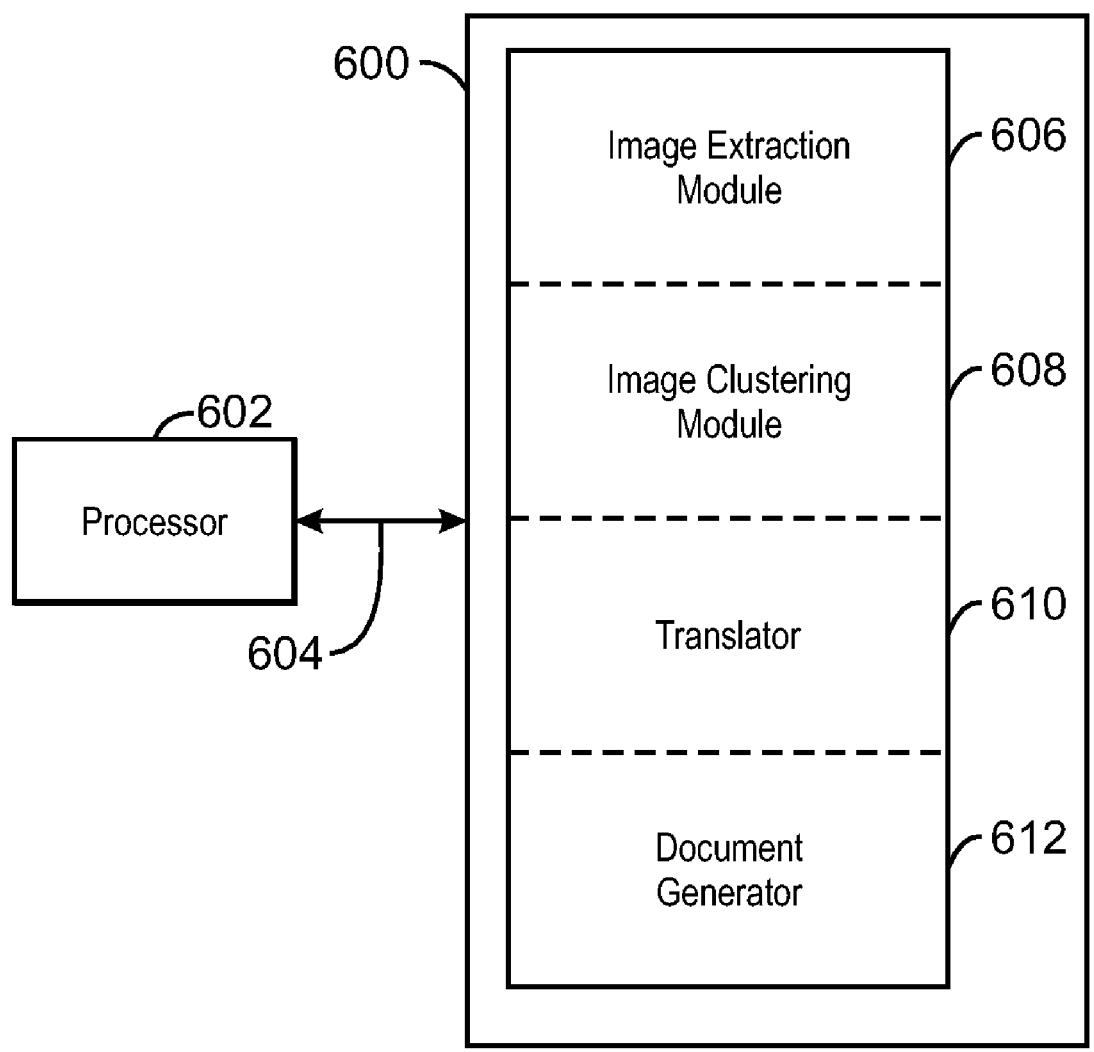
FIG. 6 is a block diagram showing a non-transitory, machine-readable medium that stores code configured to translate an image-based electronic document into a text-based electronic document, in accordance with an embodiment of the present invention.

FIG. 6 is a block diagram showing a non-transitory, machine-readable medium that stores code configured to translate an image-based electronic document into a text-based electronic document, in accordance with an embodiment of the present invention. The non-transitory, machine-readable medium is referred to by the reference number 600. The non-transitory, machine-readable medium 600 can comprise RAM, a hard disk drive, an array of hard disk drives, an optical drive, an array of optical drives, a non-volatile memory, a universal serial bus (USB) drive, a digital versatile disk (DVD), a compact disk (CD), and the like. The non-transitory, machine-readable medium 600 may be accessed by a processor 602 over a communication path 604.

As shown in FIG. 6, the various components discussed herein can be stored on the non-transitory, machine-readable medium 600. A first region 606 on the non-transitory, machine-readable medium 600 can include an image extraction module configured to electronically scan an image-based document to determine positions of word images in the image-based document and extract the word images from the image-based document. A region 608 can include an image-clustering module configured to group a subset of the word images into a word cluster based on a similarity of the word images, wherein the word images in the word cluster correspond to a same actual word. A region 610 can include a translator configured to generate a character-encoded transcription for the word cluster based on the word images in the word cluster. A region 612 can include a document generator configured to add the character-encoded transcription to a text-based electronic document at locations corresponding to the positions of the word images in the image-based document. Although shown as contiguous blocks, the software components can be stored in any order or configuration. For example, if the non-transitory, machine-readable medium 600 is a hard drive, the software components can be stored in non-contiguous, or even overlapping, sectors.

What is claimed is:

1. A method, comprising:
electronically scanning an image-based document to determine positions of word images in the image-based document;
extracting the word images from the image-based document;
grouping a subset of the word images into a word cluster based on a similarity of the word images;
generating a character-encoded transcription for the word cluster based on the word images in the word cluster; and
adding the character-encoded transcription to a text-based electronic document at locations corresponding to the positions of the word images in the image-based document.

2. The method of claim 1, wherein grouping the subset of word images into the word cluster comprises generating a feature vector for each word image in the word cluster using a dimension reduction algorithm.

3. The method of claim 1, wherein grouping the subset of word images into the word cluster comprises:
generating a feature vector for each word image in the word cluster;
generating a hash code for each feature vector using a Locality Sensitive Hashing function; and
grouping the word images into the word clusters based on each hash code.

4. The method of claim 1, wherein generating a character-encoded transcription for the word cluster comprises generating an initial transcription for each word image in the word cluster and determining the character-encoded transcription based on the initial transcriptions.

5. The method of claim 4, comprising identifying the character-encoded transcription as a most common initial transcription among the initial transcriptions generated for the word cluster.

6. The method of claim 1, wherein generating a character-encoded transcription for the word cluster comprises:
generating an initial transcription for each word image in the word cluster;
determining a letter count for each of the initial transcriptions; and
identifying a most common letter count among the initial transcriptions; and
rejecting the initial transcriptions with letter counts that differ from the most common letter count.

7. The method of claim 6, comprising identifying a most common letter at each letter position among the initial transcriptions and generating the character-encoded transcription using the most common letter identified at each letter position.

8. A computer system, comprising:
a processor that is configured to execute machine-readable instructions; and
a memory device that stores instruction modules that are executable by the processor, the instruction modules comprising:
an image extraction module configured to electronically scan an image-based document to determine positions of word images in the image-based document and extract the word images from the image-based document;
an image clustering module configured to group a subset of the word images into a word cluster based on a similarity of the word images, wherein the word images in the word cluster correspond to a same actual word;
a translator configured to generate a character-encoded transcription for the word cluster based on the word images in the word cluster; and
a document generator configured to add the character-encoded transcription to a text-based electronic document at locations corresponding to the positions of the word images in the image-based document.

9. The computer system of claim 8, wherein the image clustering module is configured to generate a feature vector for each word image in the word cluster using a dimension reduction algorithm.

10. The computer system of claim 8, wherein the image clustering module is configured to;
generate a feature vector for each word image in the word cluster using a dimension reduction algorithm;
generate a hash code for each feature vector using a Locality Sensitive Hashing function; and
group the word images into the word clusters based on each hash code.

11. The computer system of claim 8, wherein the translator is configured to generate an initial transcription for each word image in the word cluster and determine the character-encoded transcription based on the initial transcriptions.

12. The computer system of claim 11, wherein the translator is configured to identify the character-encoded transcription as a most common initial transcription among the initial transcriptions generated for the word cluster.

13. The computer system of claim 8, wherein the translator is configured to:
generate an initial transcription for each word image in the word cluster;
determine a letter count for each of the initial transcriptions; and
identify a most common letter count among the initial transcriptions; and
reject the initial transcriptions with letter counts that differ from the most common letter count.

14. The computer system of claim 13, wherein the translator is configured to identify a most common letter at each letter position among the initial transcriptions and generating the character-encoded transcription using the most common letter identified at each letter position.

15. A non-transitory, computer readable medium, comprising instruction modules configured to direct a processor to:
electronically scan an image-based document to determine positions of word images in the image-based document and extract the word images from the image-based document;
group a subset of the word images into a word cluster based on a similarity of the word images, wherein the word images in the word cluster correspond to a same actual word;
generate a character-encoded transcription for the word cluster based on the word images in the word cluster; and
add the character-encoded transcription to a text-based electronic document at locations corresponding to the positions of the word images in the image-based document.

16. The non-transitory, computer readable medium of 15, comprising instruction modules configured to direct the processor to:
generate a feature vector for each word image in the word cluster using a dimension reduction algorithm;
generate a hash code for each feature vector using a Locality Sensitive Hashing function; and
group the word images into the word clusters based on each hash code.

17. The non-transitory, computer readable medium of claim 15, comprising instruction modules configured to direct the processor to generate an initial transcription for each word image in the word cluster and determine the character-encoded transcription based on the initial transcriptions.

18. The non-transitory, computer readable medium of claim 17, comprising instruction modules configured to direct the processor to identify the character-encoded transcription as a most common initial transcription among the initial transcriptions generated for the word cluster.

19. The non-transitory, computer readable medium of claim 15, comprising instruction modules configured to direct the processor to:
generate an initial transcription for each word image in the word cluster;
determine a letter count for each of the initial transcriptions; and
identify a most common letter count among the initial transcriptions; and
reject the initial transcriptions with letter counts that differ from the most common letter count.

20. The non-transitory, computer readable medium of claim 19, comprising instruction modules configured to direct the processor to identify a most common letter at each letter position among the initial transcriptions and generating the character-encoded transcription using the most common letter identified at each letter position.

* * * * *

UNITED STATES PATENT AND TRADEMARK OFFICE
CERTIFICATE OF CORRECTION

| | | |
|---|---|---|
| PATENT NO. | : 8,208,726 B2 | Page 1 of 1 |
| APPLICATION NO. | : 12/841839 | |
| DATED | : June 26, 2012 | |
| INVENTOR(S) | : Kave Eshghi et al. | |

It is certified that error appears in the above-identified patent and that said Letters Patent is hereby corrected as shown below:

In column 8, line 28, in Claim 16, delete "15," and insert -- claim 15, --, therefor.

Signed and Sealed this
Eighteenth Day of December, 2012

David J. Kappos
*Director of the United States Patent and Trademark Office*